United States Patent
Saccoman

(10) Patent No.: US 10,878,452 B2
(45) Date of Patent: *Dec. 29, 2020

(54) METHOD AND SYSTEM FOR DYNAMICALLY ADJUSTING DISPLAYED CONTENT BASED ON ANALYSIS OF VIEWER ATTRIBUTES

(71) Applicant: AdMobilize LLC., Miami Beach, FL (US)

(72) Inventor: Rodolfo Saccoman, Miami, FL (US)

(73) Assignee: AdMobilize LLC., Miami Beach, FL (US)

(*) Notice: Subject to any disclaimer, the term of this patent is extended or adjusted under 35 U.S.C. 154(b) by 35 days.

This patent is subject to a terminal disclaimer.

(21) Appl. No.: 16/352,037

(22) Filed: Mar. 13, 2019

(65) Prior Publication Data

US 2019/0213634 A1 Jul. 11, 2019

Related U.S. Application Data

(63) Continuation of application No. 15/019,406, filed on Feb. 9, 2016, now Pat. No. 10,235,690.

(60) Provisional application No. 62/131,266, filed on Mar. 11, 2015.

(51) Int. Cl.
G06Q 30/00 (2012.01)
G06Q 30/02 (2012.01)
G06F 3/147 (2006.01)
G06F 3/14 (2006.01)

(52) U.S. Cl.
CPC ........ *G06Q 30/0255* (2013.01); *G06F 3/147* (2013.01); *G06F 3/1454* (2013.01); *G09G 2354/00* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 7,921,036 B1 * | 4/2011 | Sharma | G06Q 20/3674 705/14.49 |
| 2003/0126013 A1 | 7/2003 | Shand | |
| 2005/0197923 A1 * | 9/2005 | Kilner | G06Q 30/0201 382/118 |
| 2008/0183560 A1 * | 7/2008 | Kaplan | G06Q 30/0273 705/7.29 |

(Continued)

*Primary Examiner* — Meredith A Long
(74) *Attorney, Agent, or Firm* — Nathan & Associates; Menachem Nathan

(57) ABSTRACT

Method and system for dynamically adjusting content on at least one electronic display of a plurality N of displays, each display having associated therewith a respective beacon, at least one of the displays viewed by a plurality P of unique viewers during a sampling period $T_s$, comprising using each respective beacon to determine an average position, dwell time and gaze time of each unique viewer viewing the associated display during the sampling period, calculating an interest factor related to each display based on the average position, dwell time and gaze time, identifying a display and content having a maximal interest factor, and adjusting content on at least one other display of the plurality of displays based on an input related to the display having a maximal interest factor.

11 Claims, 2 Drawing Sheets

(56) References Cited

U.S. PATENT DOCUMENTS

| | | | |
|---|---|---|---|
| 2009/0030780 A1* | 1/2009 | York | G06Q 30/02 |
| | | | 705/14.41 |
| 2009/0177528 A1* | 7/2009 | Wu | G06Q 30/0245 |
| | | | 705/14.44 |
| 2009/0217315 A1 | 8/2009 | Malik et al. | |
| 2010/0313214 A1* | 12/2010 | Moriya | G06K 9/00771 |
| | | | 725/12 |
| 2012/0315839 A1* | 12/2012 | Mumcuoglu | H04W 4/029 |
| | | | 455/2.01 |
| 2013/0030456 A1 | 1/2013 | Assell et al. | |
| 2014/0122248 A1* | 5/2014 | Kuzama | G06Q 30/02 |
| | | | 705/14.66 |
| 2015/0070263 A1* | 3/2015 | Murillo | G06F 3/011 |
| | | | 345/156 |

* cited by examiner

METHOD AND SYSTEM FOR DYNAMICALLY ADJUSTING DISPLAYED CONTENT BASED ON ANALYSIS OF VIEWER ATTRIBUTES

CROSS REFERENCE TO RELATED APPLICATIONS

This application is a continuation application of U.S. patent application Ser. No. 15/019,406 filed Feb. 9, 2016 (now allowed as U.S. Pat. No. 10,235,690) and is related to and claims priority from U.S. provisional patent application No. 62/131,266 having the same title and filed Mar. 11, 2015, which is incorporated herein by reference in its entirety.

FIELD

Embodiments disclosed herein relate generally to advertising and more particularly to dynamic adjustment of content displayed on displays based on analysis of viewer attributes (interests, demographics, etc.).

BACKGROUND

Beacons including a camera as well as other electronic components for acquiring and transmitting data are known, see e.g. US Patent Application No. 2013/0304565. Data obtained by a beacon and related for example to an advertisement (ad) displayed on a display may be processed into metrics that provide value to a client (e.g. an advertiser). As used herein, a "display" is defined as a board with static or dynamic content, in particular ad content, and is therefore also referred to as "content display".

One disadvantage of the known use of beacons in conjunction with displays is that content displayed cannot be adjusted in response to viewer attributes (interests, demographics, etc.) dynamically (i.e. in real time).

Therefore, there is a need for and it would be advantageous to have dynamic adjustment of content on a display based on inputs received from analyzing data of viewers viewing the display.

SUMMARY

In various embodiments there are provided methods for dynamically adjusting content on at least one electronic display of a plurality N of displays, each display having associated therewith a respective beacon, at least one of the displays viewed by a plurality P of unique viewers during a sampling period $T_s$.

In an embodiment, a method may comprise the steps of using each respective beacon to determine an average position, dwell time and gaze time of each unique viewer viewing the associated display during the sampling period, calculating an interest factor related to each display based on the average position, dwell time and gaze time, identifying a display and content having a maximal interest factor, and adjusting content on at least one other display of the plurality of displays based on an input related to the display having a maximal interest factor.

In an embodiment, the step of calculating an interest factor based on the average position, dwell time and gaze time includes normalizing the average position with an optimal position to obtain a normalized position and multiplying the normalized position with a sum of the dwell time and the gaze time to obtain the interest factor.

In an embodiment, a method may further comprise the step of obtaining a median value of a parameter related to a physical attribute of the plurality of unique viewers, wherein the step of adjusting content on at least one display of the plurality of displays based on an input related to the display having a maximal interest factor further includes adjusting the content based on the parameter related to the physical attribute.

In an embodiment, a method may further comprise the step of obtaining a frequency of a parameter related to demographics of the plurality of unique viewers, wherein the step of adjusting content on at least one other display of the plurality of displays based on an input related to the display having a maximal interest factor further includes adjusting the content based on the parameter related to the demographics.

In some method embodiments, the adjusting the content based on the parameter related to the physical attribute includes matching third party content to the physical attribute parameter.

In some method embodiments, the adjusting the content based on the parameter related to demographics includes matching third party content to the demographics parameter.

In some method embodiments, the physical attribute related parameter is selected from the group consisting of height, weight, age and a combination thereof.

In some method embodiments, the demographics related parameter is selected from the group consisting of gender, ethnicity, glasses, facial hair and a combination thereof.

BRIEF DESCRIPTION OF THE DRAWINGS

Non-limiting embodiments are herein described, by way of example only, with reference to the accompanying drawings, wherein.

DETAILED DESCRIPTION

Figure 1:
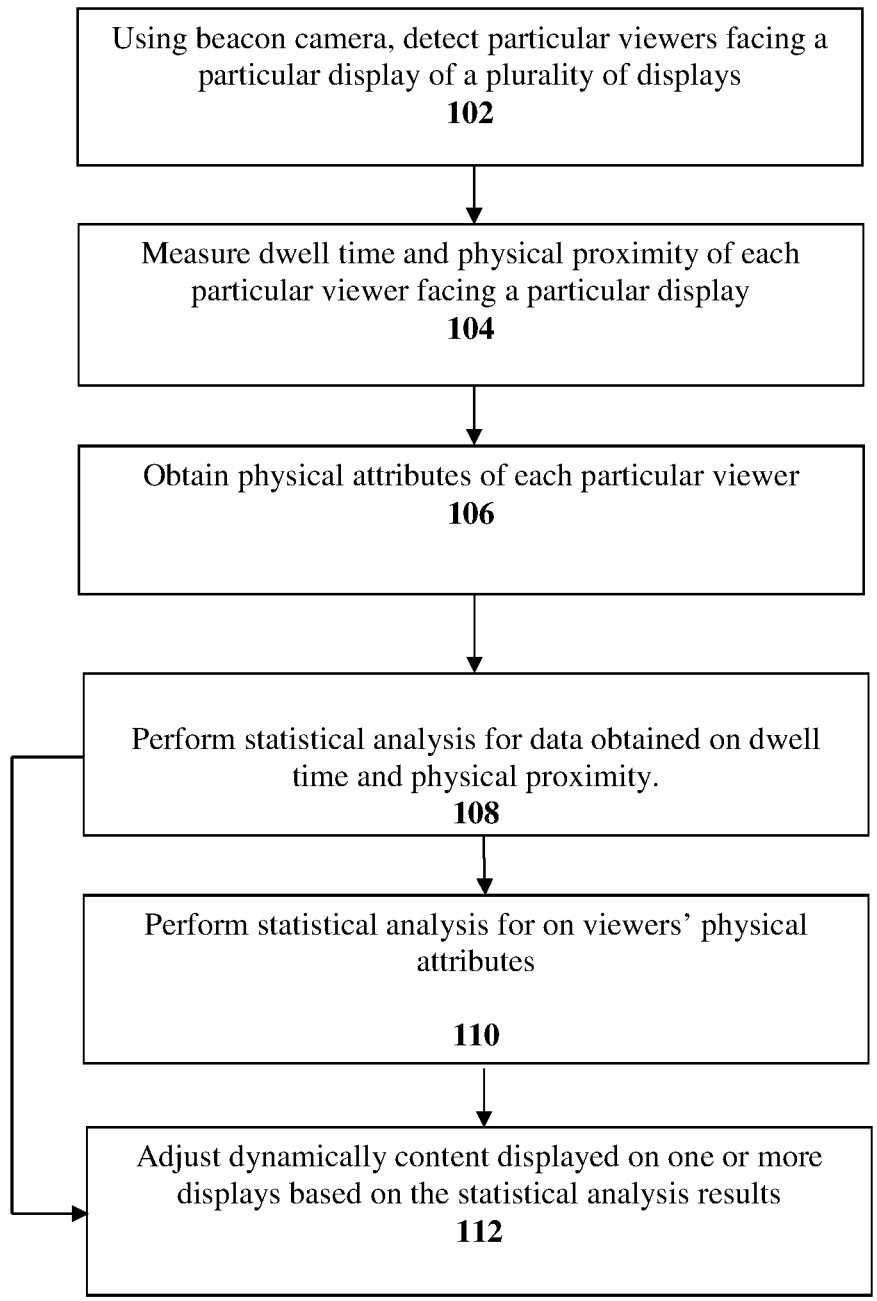
FIG. 1 shows schematically in a flow chart a method for adjusting dynamically content on a display disclosed herein.
Figure 2:
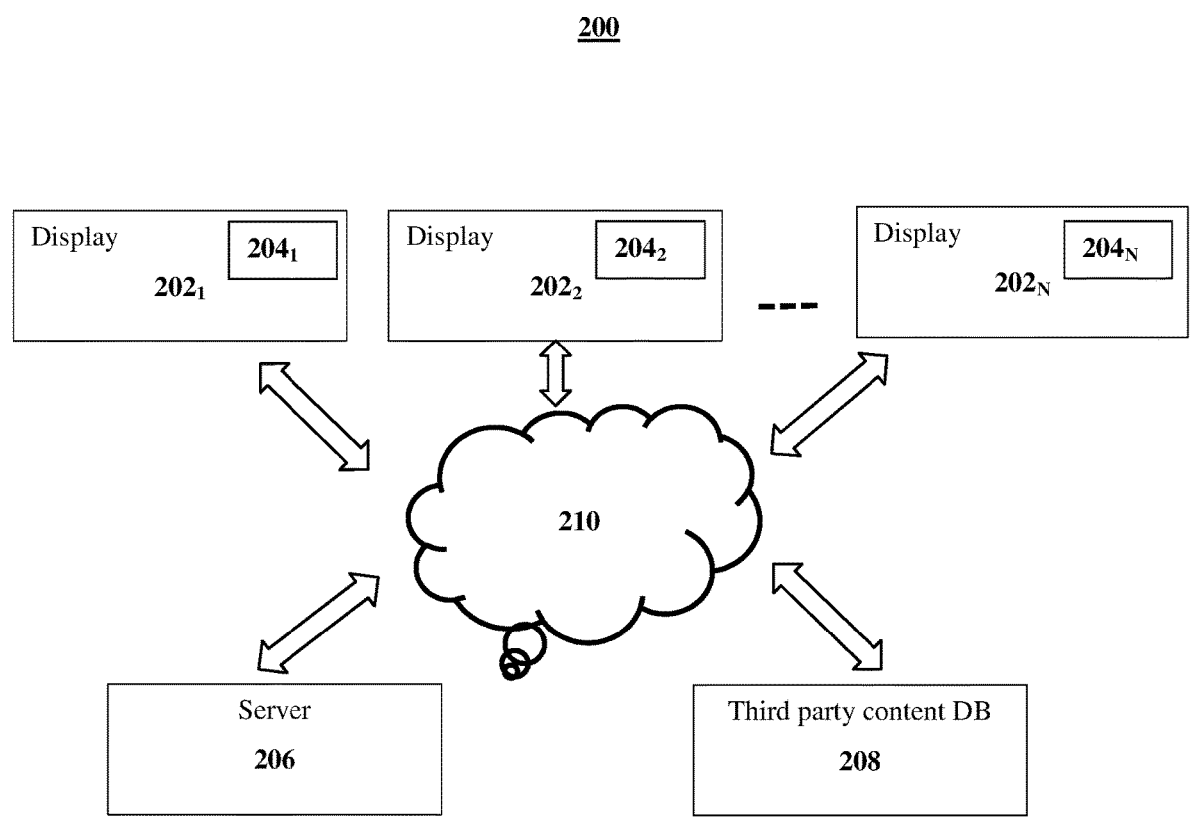
FIG. 2 shows schematically a system for performing a method for adjusting dynamically content on a display disclosed herein.

FIG. 1 shows schematically in a flow chart a preferred, but non-limiting embodiment of a method for dynamically adjusting display content disclosed herein. Exemplarily, the method is performed in a system 200 shown in FIG. 2. Such a system may include a first plurality N of displays $202_{1-N}$ and a second plurality M of respective beacons $204_{1-N}$, each beacon associated with one or more displays $202_{1-N}$. The beacons 204 and displays 202 are in communication with a server 206. As can be seen, each display 202 has at least one beacon 204 associated therewith. In a preferred non-limiting embodiment, beacon 204 may be similar to the beacons described in US patent application No. 2013/0304565. In addition, while beacons described therein include one camera, a beacon may include two or more cameras in various arrangements (not shown). Each of displays 202 and/or beacons 204 communicate with a cloud based communication network 210. One or more third party databases 208 are coupled to server 206 through cloud based communication network 210.

Display 202 may generally be any type of electronic/digital screen or display capable of converting electronically or optically transmitted information into visual content that can be exhibited to a person (also referred to as "viewer"). Examples of such displays include TV displays, tablet displays, and other personal electronic device displays. Alternatively, display 202 may be a non-electronic display, i.e. a display in which ads are switched mechanically or manually such as printed scroll or the like.

Reference is now made to FIG. 1 in which in a step 102, unique viewers are detected by a beacon camera as they approach a particular display 202. Beacon 204 of particular display 202 periodically captures an image once in a preset time period (e.g. 1 sec in a preferred non-limiting embodiment). The image may include an object that could potentially be a human face and/or body, in which case, using algorithms at server 206, or on beacon 202, the object is identified as a person. The captured image includes demographics information such as skin tone, height, eye color, weight or the like that can be analyzed using known face recognition and demographics analysis algorithms. In a preferred non-limiting embodiment, a filter is applied to remove redundancy, i.e. to count each individual person only once ("unique viewer"). The filter compares multiple images of persons across distinct frames. On each image a person is identified with specific characteristics that enable to count him/her as a unique viewer.

In step 104, the camera (or a pair of cameras) associated with beacon 204 determines and provides a position $P_D$ (also referred to as "average proximity distance") of each unique viewer relative to a particular display, a dwell time $T_D$ and a gaze time $T_G$. $T_D$ is defined as the overall time period a unique viewer spends in position $P_D$ vs a particular display. By way of non-limiting example, if an image is taken by the camera every second and the same unique viewer appears in 30 consecutive such images, the dwell time is 30 seconds. The "gaze time" is defined as the time that a unique viewer spends looking at a content display at a predefined range of visual angles ("gaze angles"). For example, content display may be set to maximize the time that viewers look at the displays at visual angles of +/−30 degrees relative to a normal azimuth. Any viewers who are outside of this +/−30 degrees range would not be considered as gazing at the content display.

The three parameters above may have the following non-limiting exemplary ranges of values: $P_D$=10 cm-10 m, $T_D$=1 ms-60 s, $T_G$=1 ms-60 s and visual angle=5-90 degrees. The position and gaze angle may change from frame to frame.

In step 106, physical attribute and/or demographics information parameters related to each unique viewer are obtained from the information provided by the camera. These parameters may include height, weight, age, gender, ethnicity, and other physical attributes extracted from the image such as wearing of glasses, facial hair, etc. Known face detections and/or recognition techniques and algorithms, for example available algorithms such as OpenCV may be used to perform face detection and/or face recognition.

In step 108, the information obtained in steps 104 over a sample time period $T_s$ (defined as the time period to capture viewers in front of content display, e.g. 10 s-10 min) is analyzed to obtain position, dwell time and gaze time statistics for the population of viewers that viewed each particular display. The statistics data may include an average for each viewer as well as an average and a distribution of statistics across a population of viewers. Each of the three parameters is averaged over a number V of unique viewers viewing a particular display of the N displays over $T_s$. This provides an average position AVG($P_D$), average dwell time AVG($T_D$) and average gaze time AVG($T_G$) per display per sampling period. Once these averages are calculated, they can be processed into an "interest factor" $I_F$. The interest factor (having dimensions of time) may be further normalized by dividing it by the sampling time.

Exemplarily, $I_F$ may be calculated by multiplying a normalized position value with the sum of the dwell time and gaze time. A normalized position value for each display may be obtained by associating each display with an "optimized" position value $P_{OPT}$, 1 meter by way of non-limiting example, and by calculating $I_F$ exemplarily as $I_F$=[Abs($P_D$−$P_{OPT}$)/$P_D$](AVG($T_D$)+AVG($T_G$)) where "Abs" indicate an absolute value of the difference. A content display with a highest $I_F$ ("$I_{Fmax}$") is then found by comparing the interest factors for all the displays. In an embodiment, the content of the display with $I_{Fmax}$ may then be displayed in step 112 on some or all of the other displays for a predetermined "viewing" time period. This represents a first embodiment of a "dynamic adjustment" of content.

In an alternative embodiment, the information obtained in step 106 on physical attribute/demographics of a population of V unique viewers over a given sample time $T_s$ is analyzed in step 110 to obtain physical attribute/demographics statistics data per display. The statistics data may include a mean, median and distribution values for height, weight and age, and a maximum frequency for gender, ethnicity, glasses and facial hair. The statistics data per display, for example the medians, may then be mapped by server 206 to demographics and third party content stored in third party database 208. A match may be made by server 206 between the median of a chosen parameter and third party content stored in third party database 208. In step 112, content displayed on a particular display is dynamically adjusted as a function of the physical attribute/demographics statistics data for that display obtained in step 110. In step 110 server 206 links a display 202 for which median physical attribute/demographics parameters have been determined by server 206 with content obtained by third parties and sorted and stored in database 208 as being associated with such parameters. Server 206 selects content to be displayed by comparing captured parameters to content stored with indicators, as a result in part of the mapping discussed above, that the specified content is to be associated with such display of content. Physical attribute/demographics parameters can therefore be mapped for targeted content.

EXAMPLE

A footwear store has ten displays $202_{1\text{-}10}$ with respective beacons $204_{1\text{-}10}$ spaced such that they are easily accessible to potential customers. At a start of a sampling period of $T_s$=5 minutes, displays one, four and seven exhibit an ad of a first Brand of sneakers of a particular model, displays $204_{2, 3, 10}$ exhibit an ad of a second Brand of sneakers of a particular model and displays $204_{5,6,8,9}$ exhibit and ad of a third Brand of sneakers of a particular model. On average, one hundred unique V viewers are in the store during the sampling period. Following the process outlined in FIG. 1 to step 104, it is determined that display $204_5$ has the highest $I_F$ during $T_s$. Consequently, server 206 in response to the $I_F$ value, changes the content of displays $204_{1\text{-}4, 7, 10}$ is adjusted (changed) to display the third Brand of sneakers of a particular model for a predetermined viewing period of ten minutes, after which the process of sampling and dynamic adjustment starts again.

In another exemplary case, during the same $T_s$, it is determined that of the hundred unique viewers V, display 5 was viewed by fifty unique viewers V, of which 23 were young females between ages eighteen and twenty four. Out of the twenty four young females, thirteen were Asian, four were Afro-American and seven were Caucasian. A third party provider maintains a database with multiple different sneaker models, of which a particular model X100 is known to be popular among young Asian females. Consequently, display 5 is adjusted to display a new ad featuring sneaker model X100 for a predetermined viewing period of 10 minutes, after which the process of sampling and dynamic adjustment starts again. Alternatively, one or more of the other displays are also dynamically changed to display the same ad for the predetermined period.

While this disclosure has been described in terms of certain embodiments and generally associated methods, alterations and permutations of the embodiments and methods will be apparent to those skilled in the art.

What is claimed is:

1. A method for dynamically adjusting content on at least one display of a plurality of displays, wherein each display has associated therewith at least one beacon and wherein at least some displays of the plurality of displays are viewed each by a respective plurality of unique viewers during a respective sampling period $T_S$, the method comprising:
   a) determining, by at least one beacon associated with a particular display, an average position $P_D$, a dwell time $T_D$ and a gaze time $T_G$ of each unique viewer who views the particular display and content displayed thereon during sampling period $T_S$;
   b) calculating, by a server in communication with the at least one beacon, an interest factor $I_F=[Abs(P_D-P_{OPT})/P_D](AVG(T_D)+AVG(T_G))$ for the particular display, wherein $P_{OPT}$ is an optimized position value and wherein $Abs(P_D-P_{OPT})$ indicates an absolute value difference $P_D-P_{OPT}$;
   c) by the server, identifying a display and the content displayed thereon having a maximal interest factor $I_{Fmax}$; and
   d) by the server, adjusting the content on at least one other display of the plurality of displays based on an input related to the display having $I_{Fmax}$.

2. The method of claim 1, wherein the adjusting the content on at least one other display includes adjusting the content on an electronic display.

3. The method of claim 1, wherein the adjusting the content on at least one other display includes adjusting the content on a non-electronic display.

4. The method of claim 1, wherein the adjusting the content on at least one other display includes adjusting the content based on content provided by a third party.

5. The method of claim 4, further comprising displaying the content provided from the third party for a predetermined viewing period.

6. The method of claim 1, wherein $T_D$ is in the range 1 ms-60 s.

7. The method of claim 1, wherein $T_G$ is in the range 1 ms-60 s.

8. The method of claim 1, wherein $P_{OPT}$ is about 1 meter.

9. The method of claim 1, further comprising obtaining a median value of a parameter related to a physical attribute of the plurality of unique viewers of each display, and wherein the adjusting the content on at least one other display includes adjusting the content based on the parameter related to the physical attribute.

10. The method of claim 9, wherein the physical attribute related parameter is selected from the group consisting of height, weight, age and a combination thereof.

11. The method of claim 9, wherein the adjusting the content based on the parameter related to the physical attribute includes matching third party content to the physical attribute parameter.

* * * * *